Feb. 18, 1930. W. F. HEROLD

RECEPTACLE FOR CIGARETTE ASHES AND THE LIKE Re. 17,598

Original Filed Sept. 16, 1927 2 Sheets-Sheet 1

INVENTOR.
WALTER F. HEROLD
BY
Harris Mattson.
ATTORNEY.

W. F. HEROLD

Feb. 18, 1930. RECEPTACLE FOR CIGARETTE ASHES AND THE LIKE Re. 17,598

Original Filed Sept. 16, 1927 2 Sheets-Sheet 2

INVENTOR.
WALTER F. HEROLD
BY Harris Wattson.
ATTORNEY.

Reissued Feb. 18, 1930

Re. 17,598

UNITED STATES PATENT OFFICE

WALTER F. HEROLD, OF UPPER MONTCLAIR, NEW JERSEY

RECEPTACLE FOR CIGARETTE ASHES AND THE LIKE

Original No. 1,652,826, dated December 13, 1927, Serial No. 219,884, filed September 16, 1927. Application for reissue filed December 9, 1929. Serial No. 412,946.

The present invention relates to an improved receptacle for cigarette ashes, and the like, and has for an object to provide a device of this character which will be neat in appearance, sanitary, convenient of operation, and in which the interior or ash receiving space is at all times closed, so that it will be odorless, and in dropping the ashes into the receptacle the interior, and its contents, will be entirely concealed from view.

To this end it is particularly proposed in this embodiment to provide a receptacle having an ash receiving space provided with a hinged bottom, and means for releasing the hinged bottom to permit it to deliver the ashes placed thereon into the receptacle, including a cover for the ash receiving space which moves into position to completely cover it before the bottom is released, such means also adapted to close the bottom before the ash receiving space is exposed by the removal of the cover. It is also proposed to provide for the sudden drop of the bottom, upon release, so that the ashes are positively removed therefrom by the jar of such sudden drop.

With the above objects and other objects in view, embodiments of the invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
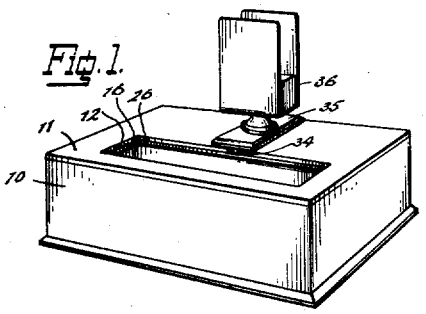
Fig. 1 is a perspective view of an ash receptacle, according to one embodiment of the invention.

Referring to the drawings, the ash receptacle, according to the embodiment of the invention shown in Figs. 1 to 6, comprises a receptacle portion 10 having an open top and which may be of any suitable form or design to receive ashes, and having a cover 11 adapted to be seated in the opening of the receptacle 10, and upon which the parts constituting the present improvements are mounted. It will be understood that the receptacle and the cover may be of any suitable form and construction to permit the cover to be removed or raised to allow ashes accumulated in the receptacle to be emptied from time to time, as it becomes filled.

The cover 11 is provided with a rectangular opening 12 and at its under side there is secured a frame consisting of end guide portions 13, 14, a forward portion 15, and a rectangular flange 16 surrounding the opening corresponding in shape to the opening 12 of the cover. The frame is furthermore recessed at the upper edges of the flange 16, as at 17, this recess extending along the forward edge of the opening and also along the side edges, the recesses at the side edges constituting a continuation of the inner edges of the side portions 13 and 14. The rear wall of the flange 16 is flanged over at its upper edge, as at 18, the upper surface of this flange 18 being flush with the recess 17, forming a longitudinal slot. The guide portions 13, 14 of the frame are provided at their rearward ends with inwardly extending stop portions 19 and 20 and are also provided with spring mounting lugs 21, 22 for cooperation with the cover slide, as will presently more fully appear. The frame portion may be brazed or otherwise suitably secured to the cover 11 and its outer edges are set in with respect to the outer edge of the cover 11, so that the structure may be set into the receptacle 10, as clearly shown in Fig. 2.

The ash receiving space formed by the flange 16 is provided with a hinged bottom 23 provided with upwardly bent flange ends 24 in which are engaged the hinge pins 25 secured at each end of the forward wall of the flange. This bottom is normally held in raised position, and is adapted to have ashes placed thereon, and is thereupon adapted to be dropped, by the mechanism presently to be described, to deliver these ashes into the receptacle.

Figure 2:
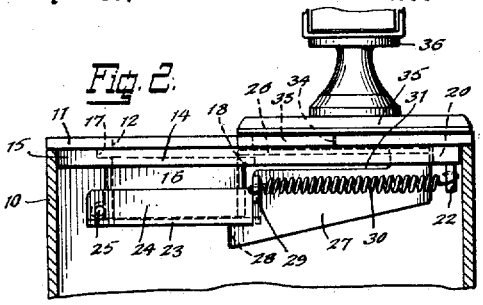
Fig. 2 is a transverse sectional view through the receptacle portion and showing the top in end elevation.
Figure 3:
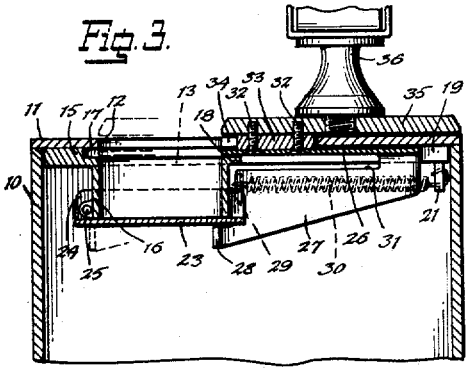
Fig. 3 is a transverse sectional view through the receptacle portion and top, showing the parts in their nomal position in which the ash receiving space is open.

A cover slide 26 is mounted at the under side of the cover 11 between the guide portions 13, 14 of the frame, and is provided at each end with downwardly bent arms 27 extending forwardly into engaging relation with the end flanges 24 of the bottom 23, and provided with inwardly bent lugs 28 which engage beneath the bottom, as shown in Figs. 2 and 3, to retain the same in its closed or raised position. At the forward edge of each of the arms there are also provided outwardly bent lugs 29 which are connected by coil springs 30 to the lugs 21, 22 of the frame and which are adapted to retain the cover slide in its rearwardly moved position against the stops 19, 20, and are also adapted to return the same to such position from the forwardly moved position, as will presently more fully appear. The side arms are furthermore provided with slots 31 adapted during the forward movement of the cover slide to embrace the flanged upper end 18 of the rear wall of the flange 16. The cover slide is connected to the cover 11 by means of screws 32 engaged through a guide block 33 disposed in a slot 34 extending rearwardly from the opening 12, and substantially central thereof, and engaged in the base 35 of a match holder 36, which constitutes a handle for manipulating the device. It will be understood that instead of the holder any other suitable means may be employed.

Figure 4:
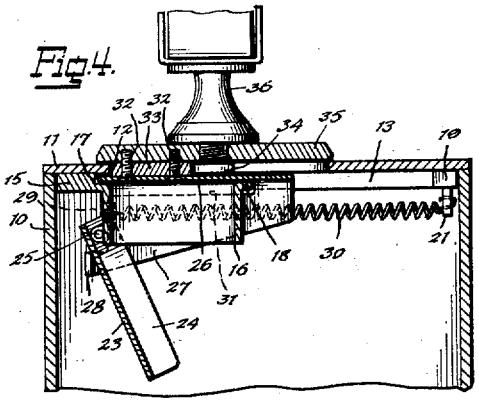
Fig. 4 is a similar view and showing the parts in their position to deliver the ashes in the ash receiving space to the receptacle.
Figure 5:
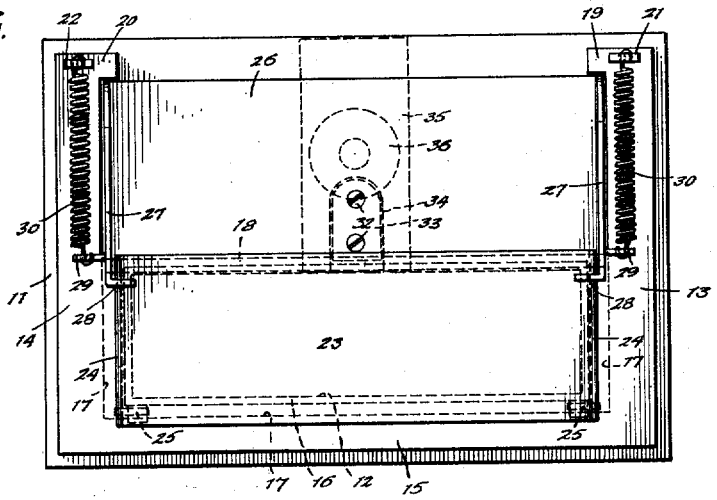
Fig. 5 is a bottom plan view of the receptacle top.
Figure 6:
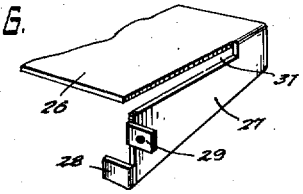
Fig. 6 is a perspective view of one end of the cover slide employed.

The operation of the device is as follows: Figs. 1, 2 and 3 show the normal position of the device in which the ash receiving space is open, so that ashes may be placed therein, where they are retained by the bottom 23. In order to deliver these ashes into the receptacle, the cover slide is moved forwardly by means of the match holder, or other suitable handle, which operation causes the cover slide to move over the ash receiving space and moves the lugs 28 forwardly beneath the bottom 23, the movement of the lugs 28 being accompanied by the coincidental movement of the cover slide. As shown in dotted lines in Fig. 3, the lugs 38 are still in retaining relation to the bottom 23 at the point where the cover slide completely closes the ash receiving space, that is, these lugs are in engagement with the bottom at a point rearwardly of the hinged axis. Upon the further forward movement of the cover slide, which is permitted by the recess 17, the lugs 28 move to a point forwardly of the hinged axis, so that the bottom 23 is no longer supported thereby and the same drops suddenly to the ash delivering position, as shown in Fig. 4, the jar of such sudden dropping positively removing the ashes therefrom. It will be noted that in this position the base 35 of the match holder is of such length that it covers the slot 34. Upon release of the cover slide springs 30 return it to its normal position, the return operation being just the reverse of the ash delivering operation just described, the bottom being first closed by the lugs 28 before the ash receiving opening is exposed by the cover slide.

Figure 7:
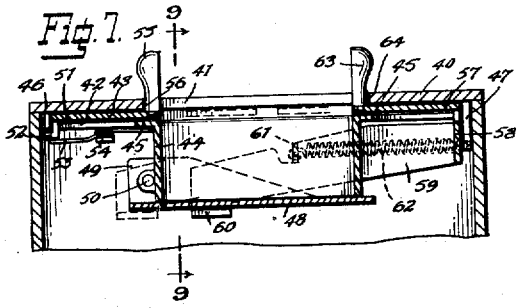
Fig. 7 is a transverse sectional view of a modified form of construction showing the same in its normal or open position.
Figure 8:
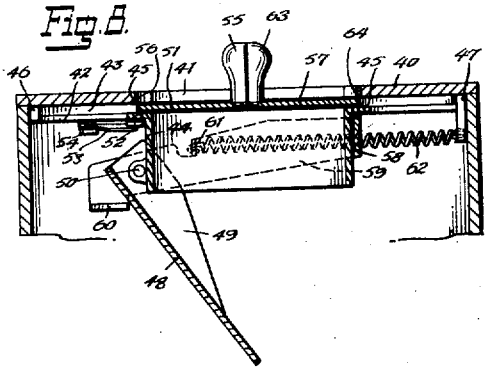
Fig. 8 is a similar view showing the same in its operative position for delivering the ashes to the receptacle.
Figure 9:
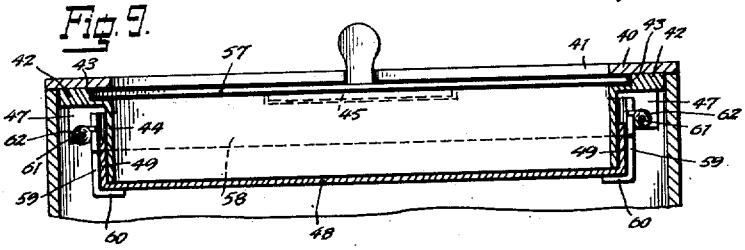
Fig. 9 is a longitudinal sectional view taken along the line 9—9 of Fig. 7.

In Figs. 7, 8 and 9 I have illustrated a modified form of construction in which two cover slides are provided for the ash receiving space adapted to be moved toward each other to close the space during the delivery of ashes into the receptacle. The cover 40 is provided with a rectangular opening 41 and at its under side there is secured a frame comprising end guide portions 42, recessed as at 43, to provide slide ways for the cover slide and provided with a rectangular flange 44 surrounding an opening corresponding to the opening 41 of the cover of the ash receiving space, and provided at the upper edges of the longitudinal walls of said flange with outwardly extending flanges 45. Stop lugs 46 are provided at one end of the flanges 42 and stop lugs 47 are provided at the other end, these latter being relatively longer and adapted, in addition to providing stops for the cover slides, to provide spring supports.

A bottom 48 having end flanges 49 is hingedly secured to the flange 44 upon hinge pins 50 in substantially similar manner to the first form of the invention.

A cover slide 51 is slidably engaged beneath the cover 40 at one side of the opening 41 in the guide portions 42 of the frame and is provided at its outer edge with downwardly bent lugs 52 adapted in the inwardly moved position of the cover slide to abut the flange 44 to limit such inward movement. Springs 53 are provided at each end of the cover slide 51, being coiled about posts 54 and having one end engaged in the lugs 52, while the other end is engaged against the surface of the flange 44, these springs adapted to exert an outward pressure upon the cover slide to normally maintain its open position. At the inner edge of the cover slide 51 there is provided an upwardly extending handle portion 55 disposed in a recess 56 cut in the forward edge of the opening 41. The other cover slide 57 is similarly mounted at the other side of the opening 41 and is provided at its rearward edge with a downwardly bent flange 58 provided with forwardly bent arms 59 at each end which extends forwardly at the sides of the flanges 49 of the bottom 48, and provided with inwardly bent supporting lugs 60 engaged with the under surface of the bottom 48. Outwardly bent lugs 61 are provided upon the arms 58 between which and the stop lugs 47 of the frame there are secured coil springs 62 adapted to normally maintain the cover slide in its outwardly moved position, and the bottom 48 in its raised or closed position. A handle portion 63 is provided upon the inner edge of the cover slide 57 disposed in a recess 64 cut in the edge of the opening 41 and disposed in opposed relation to the handle 55.

In operation the handles 56 and 63 are gripped by the fingers and drawn toward each other, and inasmuch as the springs 53 are weaker than the springs 62, the cover slide 51 will reach its limit position first, as indicated in dotted lines in Fig. 7, while the cover slide 57 will have a slight further movement before completely closing the ash receiving space. The position of the cover slide 57 up to this point is indicated by dotted lines in Fig. 7, and in such relation the lugs 59 are still in supporting relation with the bottom 48. Upon the completion of the closing movement of the cover slide 57, the lugs 59 move to the position shown in Fig. 8, whereupon the bottom 48 swings downwardly delivering the ashes collected thereon into the receptacle. Upon release of the cover slides the springs return them to their open position, first closing the bottom 48 through the initial movement of the lugs 59.

Figure 10:
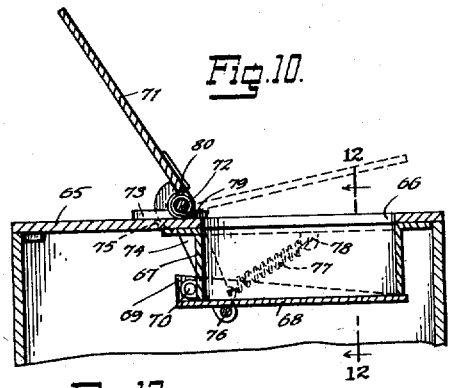
Fig. 10 is a transverse sectional view of a further modified form of construction showing the same in its normal or open position.
Figure 11:
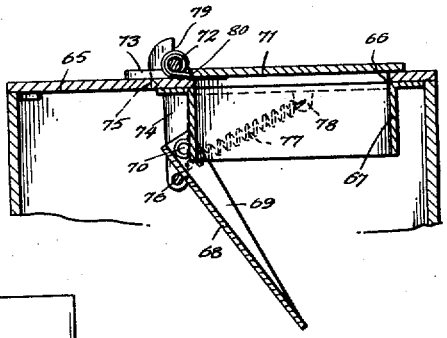
Fig. 11 is a similar view showing the same in its operative position to deliver the ashes to the receptacle.
Figure 12:
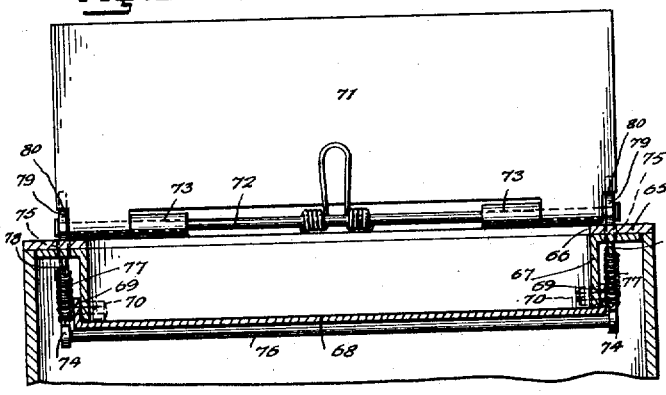
Fig. 12 is a longitudinal sectional view taken along the line 12—12 of Fig. 10.

In Figs. 10, 11 and 12 I have illustrated a further modified form of the invention. In this form the cover 65 is provided with a rectangular opening 66 and at the under side there is secured a rectangular flange 67 surrounding the ash receiving space. A bottom 68 flanged at its ends, as at 69, is hingedly connected to the flange 67 by means of hinge pins 70 in a substantially similar manner to the other forms of the invention. At one edge of the opening 66 there is provided a hinge cover 71 mounted upon an elongated hinge pin 72 supported in suitable bearings 73, and at each end of the hinge pin there are pivotally mounted arms 74 extending downwardly through the slots 75 provided in the cover 65, and having connected at their lower ends a rod 76 disposed beneath the bottom 68, and held in engagement therewith by means of springs 77 connected between the arms and lugs 78 provided at the under side of the cover 65. At the upper end of the arms 74 and in concentric relation to the hinge pins 72 there are provided segmental recesses 79 engaged by shoulders 80 provided in the hinge cover 71, the hinge cover being yieldably held in its open position against one end of these segmental recesses by means of a spring 81 engaged about the hinge pin.

The operation is as follows:

The bottom 68 is adapted to be released to deliver the ashes into the receptacle by closing the hinge cover 71. This cover is adapted to be moved to partially closed position, as shown in dotted lines in Fig. 10, before imparting movement to the arms 74. At this point the ends of the segmental recesses 79 are engaged by the cover and as the cover is moved to completely closed position the arms 74 are swung downwardly, as indicated in Fig. 11, releasing the bottom 68 which swings downwardly and delivers the ashes collected thereon into the receptacle.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. A receptacle for ashes or the like, having an ash receiving space, a movable ash support for said space, a separately movable cover for closing said space, and means whereby movement of said cover to closing position is adapted to cause movement of said support to deliver ashes into said receptacle.

2. A receptacle for ashes or the like, having an ash receiving space, a movable ash support for said space, a separately movable cover for closing said space, and means for retaining said support in ash supporting relation, said movable cover adapted upon movement to closed position to cause actuation of said last mentioned means whereby said support moves to deliver ashes into said receptacle.

3. A receptacle for ashes or the like, having an ash receiving space, a movable ash support for said space, a movable cover for said space adapted to have initial movement to substantially closed position and a further movement to completely closed position, and means adapted upon said last mentioned movement to completely closed position to effect movement of said support to deliver ashes into said receptacle.

4. In a receptacle for ashes or the like, a top having an ash receiving opening, a surrounding wall at the under side of said top forming an ash receiving space accessible through said opening, a movable ash support at the lower edge of said wall, a separately movable cover carried by said top for closing said space at its upper side, and means adapted upon coincidental movement of said cover to closing position to effect movement of said support to deliver ashes into said receptacle.

5. A receptacle for ashes or the like, having an ash receiving space, a hinged ash support for said space, a movable cover for closing said space, means for retaining said hinged ash support in ash supporting relation, said last mentioned means adapted to be actuated upon coincidental movement of said cover to closed position, whereby said support is moved to deliver ashes into said receptacle.

6. A receptacle for ashes or the like, having an ash receiving space, a hinged ash support for said space, a movable cover for closing said space, and means associated with said cover adapted to retain said support in ash supporting relation and adapted upon coincidental movement of said cover to closed position to release said support, whereby the latter moves to deliver ashes into said receptacle.

7. A receptacle for ashes or the like having an ash receiving space, a movable ash support for said space, a slidable cover for closing said space, and means carried by said cover adapted to retain said support in ash supporting relation and adapted upon movement of said cover to closed position to release said support, whereby the latter moves to deliver ashes into said receptacle.

8. A receptacle for ashes or the like, having an ash receiving space, a movable ash support for said space, a manually movable cover for closing said space, spring means for yieldably retaining said cover in open position and returning it to open position, and means whereby movement of said cover to closing position is adapted to cause movement of said support to deliver ashes into said receptacle, and movement to open position under the action of said spring means is adapted to move said ash support to ash supporting relation.

9. A receptacle for ashes or the like, having an ash receiving space, a hinged ash support for said space, a slidable cover for closing said space, and means carried by said cover adapted to retain said support in ash supporting relation and adapted upon movement of said cover to closed position to release said support, whereby the latter moves to deliver ashes into said receptacle.

10. A receptacle for ashes or the like, having an ash receiving space, a horizontally disposed ash support for said space hingedly mounted at one edge, a horizontally slidable cover for closing said space, and horizontally movable means carried by said cover engaged with said ash support at one side of said hinge to normally support it in ash supporting relation and to support it during initial movement of said cover to closed position, said means adapted to be moved to the other side of said hinge upon movement of said cover to completely closed position to release said support, whereby the latter moves to deliver ashes into said receptacle.

11. A receptacle for ashes or the like, having an ash receiving space, a movable ash support for said space, a movable cover for closing said space, and means associated with said cover adapted upon relatively slow coincidental movement of said cover to closing position to effect relatively sudden movement of said support to deliver ashes into said receptacle.

12. A receptacle for ashes or the like, having an ash receiving space, a movable ash support for said space, a pair of movable covers normally disposed at each side of said space and adapted to be moved toward each other to close said space, and means adapted upon coincidental movement of said covers to closed position to effect movement of said support to deliver ashes into said receptacle.

13. A receptacle for ashes or the like, having an ash receiving space, a movable ash support for said space, a pair of movable covers normally disposed at each side of said space and adapted to be moved toward each other to close said space, relatively weak spring means for retaining one of said covers in open position and relatively stronger spring means for retaining the other of said covers in open position, and means whereby movement of said last mentioned cover to closing position causes movement of said support to deliver ashes into said receptacle.

14. A receptacle for ashes or the like, having an ash receiving space, a movable ash support for said space, a lever adapted to normally retain said support in ash supporting relation and upon movement to release said support, a movable cover for closing said space adapted to have initial movement to substantially closed position and a further movement to completely closed position, and means whereby said last mentioned movement is adapted to actuate said lever to cause movement of said support to deliver ashes into said receptacle.

15. A receptacle for ashes or the like, having an ash receiving space, movable ash delivery means associated with said space, separately movable closure means for said space, and means associated with said closure means adapted to effect movement of said ash delivery means to deliver ashes from said space into said receptacle.

16. A receptacle for ashes or the like, having an ash receiving space, movable ash delivery means associated with said space, separately movable closure means for said space, and means associated with said closure means whereby said closure means has coincidental movement with said last named means, said last named means adapted upon such movement to effect movement of said ash delivery means to deliver ashes from said space into said receptacle.

17. A receptacle for ashes or the like, having an ash receiving space, movable ash delivery means associated with said space, separately movable closure means for said space, and means adapted upon coincidental movement of said closure means to closing position to effect movement of said ash delivery means to deliver ashes from said space into said receptacle.

18. A receptacle for ashes or the like, having an ash receiving space, movable ash delivery means associated with said space, separately movable closure means for said space, and means associated with said ash delivery means and said closure means, adapted upon coincidental movement of said closure means to closing position to effect movement of said ash delivery means to deliver ashes from said space into said receptacle, and upon coincidental movement of said closure means to open position to effect return movement of said ash delivery means.

Signed at Bridgeport, in the county of Fairfield, and State of Connecticut, this 29th day of November, 1929.

WALTER F. HEROLD.